(12) United States Patent
Suri et al.

(10) Patent No.: US 12,301,829 B2
(45) Date of Patent: May 13, 2025

(54) VIDEO ENCODING USING DEVIATION-ADJUSTED BITRATE PARAMETER

(71) Applicant: Microsoft Technology Licensing, LLC, Redmond, WA (US)

(72) Inventors: Nitin Suri, Redmond, WA (US); Carlos Alberto Lopez Servin, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 373 days.

(21) Appl. No.: 17/829,118

(22) Filed: May 31, 2022

(65) Prior Publication Data

US 2023/0388515 A1    Nov. 30, 2023

(51) Int. Cl.
*H04N 19/146* (2014.01)
*H04N 19/132* (2014.01)
(Continued)

(52) U.S. Cl.
CPC ......... *H04N 19/146* (2014.11); *H04N 19/132* (2014.11); *H04N 19/14* (2014.11);
(Continued)

(58) Field of Classification Search
CPC .... H04N 19/132; H04N 19/146; H04N 19/15; H04N 19/463; H04N 21/2662; H04N 21/8456; H04N 19/172
See application file for complete search history.

(56) References Cited

U.S. PATENT DOCUMENTS

2014/0142955 A1*  5/2014  Alsina ............... G10L 19/24
                                                       704/500
2018/0309998 A1   10/2018  Edpalm et al.
(Continued)

FOREIGN PATENT DOCUMENTS

JP         2008263443 A    10/2008

OTHER PUBLICATIONS

"Online Source Rate Control for Adaptive Video Streaming Over HSPA and LTE-Style Variable Bit Rate Downlink Channels"—Yang et al., IEEE Transactions on Vehicular Technology, vol. 65, No. 2, Feb. 2016 (Year: 2016).*

(Continued)

*Primary Examiner* — Mainul Hasan
(74) *Attorney, Agent, or Firm* — Klarquist Sparkman, LLP

(57) ABSTRACT

Techniques and solutions are described for encoding digital video files, such as for streaming applications. Data associated with the digital video file forms a dataset that can be characterized by a measure of the dataset's center, such as an average, and a spread of the dataset, such as a deviation, with respective to a bitrate over a duration of the digital video file. The measure of center and spread are used to calculate a deviation-adjusted bitrate. A deviation adjusted bitrate can be calculated for the entire digital video file, or for particular subsets of the digital video file, such as for segments of a duration forming units of video streaming Disclosed techniques can provide various advantages, including using a reduced bitrate for video or video portions as compared with an average or static bitrate, for lower-complexity video, or using a higher bitrate for video or video portions for higher-complexity video.

20 Claims, 16 Drawing Sheets

(51) Int. Cl.
*H04N 19/14* (2014.01)
*H04N 19/167* (2014.01)
*H04N 19/172* (2014.01)
*H04N 19/463* (2014.01)

(52) U.S. Cl.
CPC ......... *H04N 19/167* (2014.11); *H04N 19/172* (2014.11); *H04N 19/463* (2014.11)

(56) References Cited

U.S. PATENT DOCUMENTS

| | | | | |
|---|---|---|---|---|
| 2019/0166170 | A1* | 5/2019 | Ramaswamy | H04L 65/61 |
| 2019/0289296 | A1* | 9/2019 | Kottke | H04N 19/179 |
| 2019/0379718 | A1* | 12/2019 | Mueller | H04L 47/10 |
| 2019/0387265 | A1* | 12/2019 | Mueller | H04N 21/2402 |
| 2021/0329255 | A1* | 10/2021 | Smole | H04N 19/136 |
| 2023/0247205 | A1* | 8/2023 | Gillis | H04N 21/8456 375/240.03 |

OTHER PUBLICATIONS

"Adaptive bitrate transcoding for power efficient video streaming in mobile devices"—Hemalatha et al., 2015 3rd International Conference on Signal Processing, Communication and Networking (ICSCN) (Year: 2015).*

"HLS Authoring Specification for Apple Devices Appendixes", Retrieved from: https://developer.apple.com/documentation/http_live_streaming/http_live_streaming_hls_authoring_specification_for_apple_devices/hls_authoring_specification_for_apple_devices_appendixes#3151781, Retrieved on: May 30, 2022, 6 Pages.

"QuickTime File Format Specification", Retrieved from: https://wikileaks.org/sony/docs/05/docs/Apple/qtff.pdf, Aug. 14, 2012, 446 Pages.

"The Sample Table Atom ( 'stbl' )", Retrieved from: https://web.archive.org/web/20210417062031/http://mirror.informatimago.com/next/developer.apple.com/documentation/QuickTime/REF/Streaming.35.htm, Apr. 17, 2021, 4 Pages.

Ahmad, et al., "Video transcoding: an overview of various techniques and research issues", In Journal of IEEE Transactions on Multimedia, vol. 7, Issue: 5, Oct. 2005, pp. 793-804.

Hashemizadehnaeini, Shabnam, "Transcoding H.264 Video via FFMPEG encoder", In Politecnico Di Milan, Thesis, Jan. 1, 2015, 152 Pages.

"International Search Report and Written Opinion Issued in PCT Application No. PCT/US2023/018409", Mailed Date: Jul. 6, 2023, 15 Pages.

Tudor, et al., "Real-time transcoding of MPEG-2 video bit streams", In International Broadcasting Convention, Sep. 12, 1997, pp. 296-302.

* cited by examiner

400 →

404 incomingVideoTranscodeQosEvent.InputVideoBitrate=(long?) transcodeRequestDesription. PlaybackSessionData?.VideoBitrateBps;
    incomingVideoTranscodeQosEvent.InputVideoFrameHeight = transcodeRequestDescription. PlaybackSessionData?.InputFrameHeightPixel s;
    incomingVideoTranscodeQosEvent.InputVideoFrameWidth = transcodeRequestDescription. PlaybackSessionData?.InputFrameWidthPixels; → 406
    incomingVideoTranscodeQosEvent.InputVideoFrameRate = transcodeRequestDescription. PlaybackSessionData?.FrameRate1000Fps;
408 ↗                                                                                                              410 ↗

FIG. 4

```
standardDeviation = 0;
absoluteDeviation = 0;
var cancellationToken = new CancellationToken ();                    504
var moovBox = VideoMetadataHelpers.ParseMoovBox(cancellationToken, source);
cancellationToken.ThrowIfCancellationRequested();
if (moovBox != null && moovBox.Size < 1024 * 1024) // MaxMoovBoxSize
{
    ParsedBox videoTrack = Mp4Helpers.TryGetTrackByMediaType(moovBox, "vide");
    ParsedBox stblBox = videoTrack.GetChild("media").GetChild("minf").GetChild("stbl ");
    vint [] sampleSizes = Mp4Helpers.ParseStsz( cancellationToken, stblBox.GetChild( "stsz").InnerContent);
    ulong durationBasedOnframesPerSecond • (ulong)(sampleSizes.Length / frameRate);     508
    ulong[] bitsPerSecondBuckets • new ulong[durationBasedOnframesPerSecond];
    uint currentBitratePerSecondBucket;
512 for (currentBitratePerSecondBucket = 0; currentBitratePerSecondBucket < durationBasedOnframesPerSecond; currentBitratePerSecondBucket++)
    {
        uint sampleOffset = currentBitratePerSecondBucket * frameRate;
        for (int currentSample = 0; currentSample < frameRate; currentSample++)
516     {
            bitsPerSecondBuckets[currentBitratePerSecondBucket] += sampleSizes[sampleOffset + currentSample] • 8; // sample sizes are on bytes
            double sumOfSquareDeviations = 0;
            ulong suIIIOfAbsoluteDeviations = 0;
            for (currentBitratePerSecondBucket = 0; currentBitratePerSecondBucket < durationBasedOnframesPerSecond; currentBitratePerSecondBucket++)
            {
                long deviation • (long)(bitsPerSecondBuckets[currentBitratePerSecondBucket] - bitrate);
                sumOfSquareDeviations += Math.Pow(deviation, 2);                        520
                sumOfAbsoluteDeviations += (ulong)Math.Abs( deviation);
                standardDeviation = ( ulong)Math.Sqrt(sumOfSquareOeviations / durationBasedOnframesPerSecond);
                absoluteDeviation = sumOfAbsoluteDeviations / durationBasedOnframesPerSecond;       524
}
```

FIG. 5A

```
/// <summary>
/// This function calculates the content aware bitrate using 2 sources of information:
/// 1) The input video average bitrate and 2) the per second bitrate variability.
///
/// We know that for a video that doesn't have a lot of bitrate variation, the average bitrate is good enough
/// to produce good quality segments while producing an output of reasonable size. On the other hand,
/// if the video has a lot of bitrate variability, the average bitrate will not be enough for some segments
/// and it will produce visual degradation due to too much compression. In that case, we could use the
/// bitrate variability (variation) as heuristic to increase the average bitrate (our baseline) more or
/// less depending on the input video content's nature (constant bitrate, semi constant, jumpy, etc.).
///
/// The content aware bitrate is generated by adding the absolute deviation to the input's video average bitrate.
/// The deviation is calculated using the stsz box that contains the size in bytes per frame.
/// The absolute deviation seems to capture very well the bitrate's variability as it will be 0 or close to 0
/// for videos with constant/almost constant bitrate and close to the input average bitrate for videos with a lot
/// of bitrate variability which will allow us to produce good quality outputs for those peaks of bitrate while still
/// producing segments of reasonable size (not choosing the max bitrate per second of the video as that is inefficient).
/// </summary>
/// <param name="moovBox">The moov (header) box of the mp4</param>
/// <param name="inputVideoAverageBitrate">The average bitrate of the video in bits per second.</param>
/// <param name="frameRate">The frame rate of the input video.</param>
/// <param name="deviationRatio">A ratio used to calculate how many deviations should be added to the input video's averate bitrate.</param>
/// <param name="contentAwareBitrateBasedOnDeviationOfStszAtomValues">The calculated content aware bitrate based on deviation of stsz atom values.</param>
protected static bool TryCalculateContentAwareBitrateBasedOnDeviationOfStszAtomValues(
    ParsedBox moovBox,
    ulong inputVideoAverageBitrate,
    uint frameRate,
    double deviationRatio,
    out ulong? contentAwareBitrateBasedOnDeviationOfStszAtomValues)
```

FIG. 5B

```
        contentAwareBitrateBasedOnDeviationOfStszAtomValues = null;
        try
        {
            if (moovBox != null && moovBox.Size < MaxMoovBoxSize)
            {
                if (Mp4Helpers.TryGetVideoTrack(moovBox, out ParsedBox videoTrack))
                {
                    ParsedBox stblBox = videoTrack.GetChild("mdia").GetChild("minf").GetChild("stbl");
                    (uint sampleSize, uint[] sampleSizes) = Mp4Helpers.ParseStsz(new CancellationToken(), stblBox.GetChild("stsz").InnerContent);

// Sample size being different than 0 indicates all frames have the same size. In that case, average bitrate is the optimal
                    // bitrate so there is no work to do.
                    if (sampleSize == 0)
                    {
                        contentAwareBitrateBasedOnDeviationOfStszAtomValues =
CalculateContentAwareBitrateBasedOnDeviationOfStszAtomValues(inputVideoAverageBitrate, deviationRatio, frameRate, sampleSizes);
                    }
                    else
                    {
                        contentAwareBitrateBasedOnDeviationOfStszAtomValues = inputVideoAverageBitrate;
                    }

// If we get to this line, that means no exception was observed, therefore the content aware bitrate was calculated.
                    return true;
                }
            }
        }
        catch (Exception ex)
        {
            // Ignore if any error occurs while trying to calculate the content aware bitrate
            LogWriter.Log($"Error while calculating the content aware bitrate based on stsz atom values. Exception: {ex}");
        } return false;
    }
```

FIG. 5C

```
private static ulong CalculateContentAwareBitrateBasedOnDeviationOfStszAtomValues(
    ulong inputVideoAverageBitrate,
    double deviationRatio,
    uint frameRate,
    uint[] sampleSizes)
{
    uint numberOfFrames = (uint)sampleSizes.Length;
    uint fullSeconds = numberOfFrames / frameRate;

if (fullSeconds <= 1)
    {
        // return the average bitrate if the video is one second or less. The variation is calculated based
        // on per second deviations and a video this short will not get any improvement.
        return inputVideoAverageBitrate;
    } ulong currentBytesPerSecond = 0;
    uint numberOfFramesProcessed = 0;
    ulong sumOfAbsoluteDeviations = 0;
    for (uint currentFrame = 0; currentFrame < numberOfFrames; currentFrame++)
    {
        if (numberOfFramesProcessed < frameRate)
        {
            currentBytesPerSecond += sampleSizes[currentFrame];
            numberOfFramesProcessed++;
        }
        else
        {
            // Calculate absolute deviation
            long deviation = (long)((long)(currentBytesPerSecond * 8) - inputVideoAverageBitrate); // inputVideoAverageBitrate is in bits per second
            sumOfAbsoluteDeviations += (ulong)Math.Abs(deviation);
            // Reset counters
            numberOfFramesProcessed = 0;
            currentBytesPerSecond = 0;
        }
    }
```

FIG. 5D

```
// Calculate the absolute deviation of the fraction of a second at the end (if needed).
if (numberOfFramesProcessed > 0)
{
    double fractionOfSecond = numberOfFramesProcessed / frameRate;
    long deviation = (long)((currentBytesPerSecond * 8) - (inputVideoAverageBitrate * fractionOfSecond));
    sumOfAbsoluteDeviations += (ulong)Math.Abs(deviation);
} ulong absoluteDeviation = sumOfAbsoluteDeviations / fullSeconds;

return inputVideoAverageBitrate + (ulong)(absoluteDeviation * deviationRatio);
}
```

FIG. 5E

```
                                                                                           ┌─ 600
{                                                           ┌─ 604                    ┌─ 608
    "ContentAwareBitrateBasedOnDeviationOfStszAtomValuesEnabled": true,
612 ─┐ "CalculateContentAwareBitrateBasedOnDeviationOfStszAtomValuesDuringAnalysis": true,
       "CalculateContentAwareBitrateBasedOnDeviationOfStszAtomValuesDuringPlayback": false,
       "ContentAwareBitrateBasedOnDeviationOfStszAtomValuesRatio": 1.0
}   └─ 616

┌─ 650
{                                                                              ┌─ 654    ┌─ 648
    "ContentAwareBitrateBasedOnDeviationOfStszAtomValuesEnabled": true,
    "CalculateContentAwareBitrateBasedOnDeviationOfStszAtomValuesDuringAnalysis": true,
    "CalculateContentAwareBitrateBasedOnDeviationOfStszAtomValuesDuringPlayback": false,
    "CalculateContentAwareBitrateForSegmentBasedOnDeviationOfStszAtomValuesDuringAnalysis": true,
    "CalculateContentAwareBitrateForSegmentBasedOnDeviationOfStszAtomValuesDuringPlayback": false,
    "ContentAwareBitrateBasedOnDeviationOfStszAtomValuesRatio": 1.0
}
```

FIG. 6

```
#EXTM3U
#EXT-X-VERSION:6
#EXT-X-PLAYLIST-TYPE:VOD
#EXT-X-TARGETDURATION:6
#EXT-X-MAP:URI="http://onedrive.com/mydata/livefolders/fakeurl.mp4?track=video&part=initsegment&quality=&track=video"
#EXTINF:6, no desc
http://onedrive.com/mydata/livefolders/
fakeurl.mp4?track=video&quality=&part=mediasegment&track=video&videoDuration=48000&segmentTime=0&bitrate=segmentbitrate
#EXTINF:4, no desc
http://onedrive.com/mydata/livefolders/
fakeurl.mp4?track=video&quality=&part=mediasegment&track=video&videoDuration=48000&segmentTime=48000&bitrate=segmentbitrate
#EXT-X-ENDLIST
```
↑ 710

```
<Representation mimeType="video/mp4"
    frameRate="24"
    bandwidth="1558322"
    codecs="avc1.4d401f" width="1277" height="544">
  <SegmentList duration="10">
    <Initialization sourceURL=" http://onedrive.com/mydata/video-1500/
init.mp4&bitrate=segmentbitrate "/>
    <SegmentURL media="http://onedrive.com/mydata /video-1500/segment-0.m4s
&bitrate=segmentbitrate "/>
    <SegmentURL media="http://onedrive.com/mydata /video-1500/segment-3.m4s
&bitrate=segmentbitrate "/>
    <SegmentURL media="http://onedrive.com/mydata /video-1500/segment-4.m4s
&bitrate=segmentbitrate "/>
  </SegmentList>
</Representation>
```
↑ 720

FIG. 7

VIDEO ENCODING USING DEVIATION-ADJUSTED BITRATE PARAMETER

FIELD

The present disclosure generally relates to video encoding, including video transcoding. Particular implementations calculate a measure of the spread, such as standard deviation or an absolute mean deviation, of a bitrate of a video file or segments thereof for use in calculating a deviation-adjusted bitrate than is provided to a video encoder as an encoding parameter.

BACKGROUND

From its beginning in the early 1990s, video streaming has become an enormously popular use of the internet and has disrupted entire industries—gone are the days of renting VHS tapes or DVDs from the local rental store. As computers become smaller and more powerful, video streaming has migrated from desktop and laptop applications to being a major use of tablets and smartphones.

Despite improvements in general computing hardware, and in networking technologies, video streaming remains highly resource intensive. While streaming video quality has increased, it is still important to encode video in a way that improves quality while reducing data processing and data transfer requirements. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for encoding digital video files, such as for streaming applications. Data associated with the digital video file forms a dataset that can be characterized by a measure of the dataset's center, such as an average, and a spread of the dataset, such as a deviation, with respective to a bitrate over a duration of the digital video file. The measure of center and spread are used to calculate a deviation-adjusted bitrate. A deviation adjusted bitrate can be calculated for the entire digital video file, or for particular subsets of the digital video file, such as for segments of a duration forming units of video streaming Disclosed techniques can provide various advantages, including using a reduced bitrate for video or video portions as compared with an average or static bitrate, for lower-complexity video, or using a higher bitrate for video or video portions for higher-complexity video. Disclosed innovations can be implemented in hardware, software, or a combination thereof.

In one aspect, a method is provided for encoding video, such as for use in video streaming applications. A digital video file is received. An average bitrate of at least a portion of the digital video file is determined. A deviation from the average bitrate is determined for at least a first segment of a plurality of segments of the digital video file. A deviation-adjusted bitrate is calculated using the average bitrate and the deviation. The deviation-adjusted bitrate is provided as an encoding parameter to a video encoder. Encoded video is received from the video encoder and can be sent to a client device to be rendered for display.

In another aspect, a method is provided for encoding video using a deviation-adjusted bitrate that is determined using measures of a center and a spread for a bitrate associated with a digital video file. A digital video file is received. A measure of a center of a bitrate for a plurality of portions of the digital video file is calculated. A measure of a spread for the plurality of portion of the digital video file is determined. A deviation adjusted bitrate is calculated using the measure of the center and the measure of the spread. The deviation-adjusted bitrate is provided as an encoding parameter to a video encoder. Encoded video is received from the video encoder.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 4 presents example code illustrating how a deviation-adjusted bitrate can be provided as a video encoding parameter.

FIGS. 5A-5E present example code for calculating a deviation-adjusted bitrate.

FIG. 6 presents example code for configuring use or properties of deviation-adjusted bitrate encoding.

FIG. 7 presents example HLS and DASH manifests that include deviation-adjusted bitrate information.

DETAILED DESCRIPTION

Example 1—Overview

Figure 1:
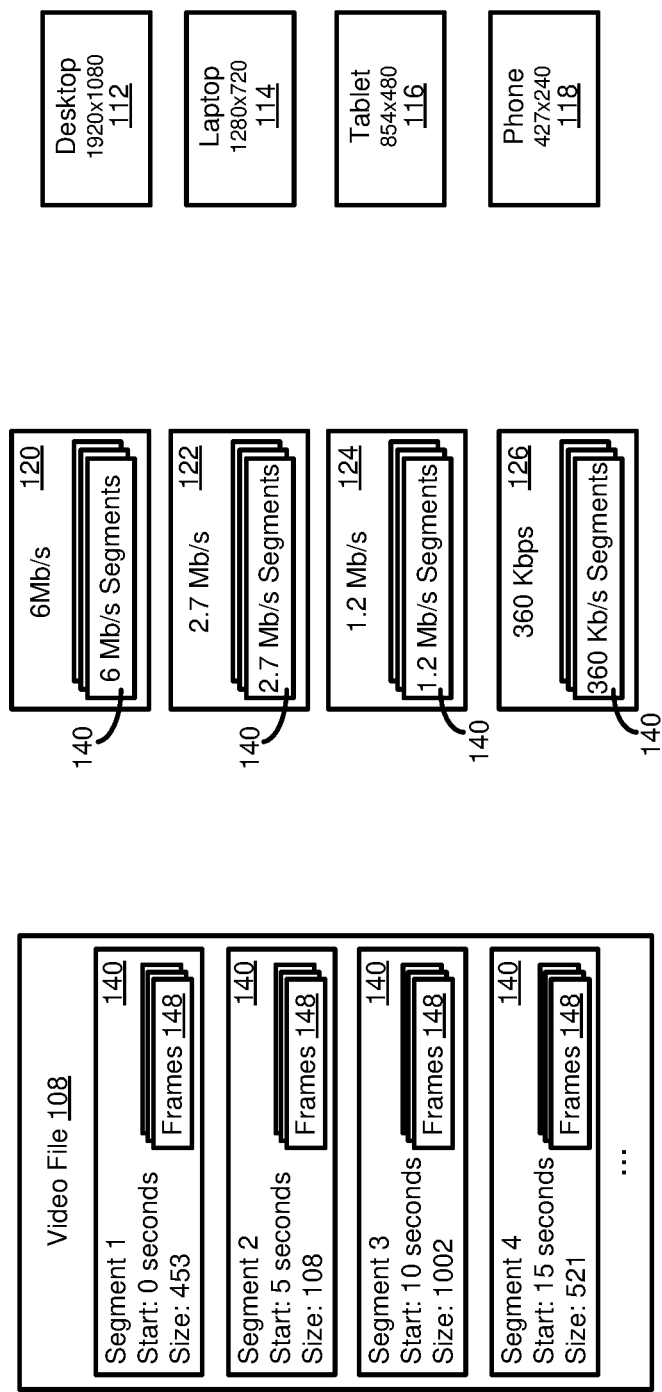
FIG. 1 is a diagram illustrating a computing environment supporting video streaming, including at different video quality levels.

From its beginning in the early 1990s, video streaming has become an enormously popular use of the internet and has disrupted entire industries—gone are the days of renting VHS tapes or DVDs from the local rental store. As computers become smaller and more powerful, video streaming has migrated from desktop and laptop applications to being a major use of tablets and smartphones.

Despite improvements in general computing hardware, and in networking technologies, video streaming remains highly resource intensive. While streaming video quality has increased, it is still important to encode video in a way that improves quality while reducing data processing and data transfer requirements. Accordingly, room for improvement exists.

There are a number of issues that can complicate video streaming technologies. One complication is that typically videos are made available for streaming at a variety of quality levels. For example, a video quality that is suitable for hardwired network connections using computing devices having relatively fast processing capabilities may not be suitable for smartphones that may be accessing video over cellular networks, particularly as cellular networks can vary greatly in the speeds they support.

As another issue, it is common for videos to be made available at different quality levels in the expectation that they will be accessed. For instance, a streaming content delivery service may make commercially produced movies available to subscribers, and it can be anticipated that a significant portion of the subscribers are likely to view any given video. Since there is a high expectation that the videos will be viewed, it may be justifiable to spend resources on high quality encoding techniques to encode videos in an optimized way, and to store the encoded videos for use, including in multiple formats/quality levels.

In other scenarios, it may not be prudent or practicable to process videos for use, both in terms of the computing power to encode the videos and the storage needed to store the encoded videos for use. As an example, content sources that accept content from users may have thousands of videos, many of which may never be watched, or watched so infrequently that preprocessing and storing the videos does not make sense. This issue is exacerbated when a video is made available at multiple quality levels.

To help address issues with providing pre-processed videos, "just in time" encoding techniques have been developed. In these techniques, encoded video for transmission is not stored, but is generated in response to user requests. Typically, metadata for a video file, such as a manifest, advertises certain information to consuming applications, including bitrates that are available for selection. When a request to view a video at a particular bitrate is received, the video is typically served to the consuming application in discrete units, such as segments that range between one second and five seconds in duration.

In typical techniques, once a bitrate is selected, that bitrate is used for all of the segments in a video, regardless of the particular properties of a segment. However, video files often contain quite a bit of variability in content/complexity over the course of the video. Parts of the video may have frames that differ very little, while other portions, such as scene changes, may have large differences between frames. In general, a smaller number of bits per unit time (bitrate) is needed to encode "simple" video compared with "complex" video. Often, if a particular bitrate is designated, and the source video does not require the designated bitrate, an encoder will still attempt to provide a segment that satisfies the target bitrate, even if that means including unnecessary data.

An issue in prior techniques, then, is that selecting a static bit rate for an entire video can result in some segments of the video having a larger size than needed, with no improvement in quality. On the other hand, a static bitrate may not be sufficiently high for other segments, which may result in visual degradation.

One way of addressing the issues identified above is to select a bitrate at which to encode a video by using an average bitrate of the video. This can be advantageous, as the bitrate can better tailored to a particular video, since an arbitrary/predetermined bitrate is replaced by the average bitrate for a particular video. However, using the average bitrate can still result in quality issues, particularly for videos that have high bitrate variability. In these situations, the average bitrate may be less than a standard/static bitrate, and so "wastes" less bits for segments of the video with bitrates that are about the average bitrate or lower, but can result in complex/high bitrate portions of the video being compressed even more than they would be using a standard/static bitrate, resulting in more severe visual degradation.

The present disclosure provides techniques for providing deviation-adjusted (which also an be referred to as content-aware) bitrate encoding. In particular, the present disclosure provides techniques that analyze bitrate variability within a video file, or a portion thereof, in order to determine a bitrate for use in encoding the video. As an example, rather than just analyzing the average bitrate for a file, a deviation from the average, such as a standard deviation or other statistical function, can be calculated. Bitrate information for the file (or segment), such as the average bitrate or the median bitrate, can be combined with the deviation information to set a bitrate for encoding. For convenience of presentation, a "generalized" bit rate that provides an overall assessment of a bitrate for a video file or segment (a "center" of the dataset) will be discussed using the "average" bitrate, although a median bitrate or other value can be used with departing from the scope of the present disclosure. Various mathematical operations and functions can be used to calculate a deviation-adjusted bitrate from center and spread information, but in a simple case a deviation amount can simply be added to an average bitrate.

In the case of videos with comparatively little variability, the deviation-adjusted bitrate will be close to the average bitrate. In such cases, optionally the average bitrate can be used. In the case where bitrate deviations are calculated for individual video segments, the deviation-adjusted bitrate technique can optionally be selectively activated or deactivated, including by determining whether a deviation satisfies a threshold. For instance, deviation-adjusted bitrate encoding for individual video segments may be enabled only if the standard deviation for the video file overall exceeds a specified value. In a more specific example, a deviation-adjusted bitrate is advertised in a manifest for the video file as a maximum supported bitrate. In some cases, a deviation-adjusted bitrate for a given segment is only enabled if its value is less than or equal to the advertised overall deviation-adjusted bitrate for the file. In yet a further implementation, instead of the overall deviation-adjusted bitrate for the file being advertised in the manifest, the bitrate of the highest-bitrate segment can be advertised as the highest supported bitrate for the file, or otherwise using an advertised bitrate that is higher than the overall deviation-adjusted bitrate.

As discussed above, deviation-adjusted bit rates can be calculated for entire video files or for particular segments of a video file, where the segments can correspond to, for example, segment sizes that will be provided to clients. If video is sent to client in five second segments, then deviation-adjusted bit rates can be calculated for five second segments. Calculating per-segment bit rates can otherwise be performed in a similar manner as for a file. That is, an average bit rate can be determined as well as deviation from the average, and the two values can be combined to determinate a deviation-adjusted bit rate.

The present disclosure can provide a number of advantages. By providing customized bitrates for just in time encoding, improved encoding can provide better quality video even though the encoding may not be as optimized as for techniques where pre-encoded bitrate versions of a video are made available. However, in at least some cases, deviation-adjusted bitrates can result in lower bitrates being used when content does not require higher bitrates, particularly when encoding is carried out for individual video segments.

The disclosed techniques can enable adaptive-bitrate encoding. That is, a bitrate can be used that is close to the average bitrate for videos which have a consistent (for example, near-average) bitrate, but can adaptively increase the encoding bitrate for videos having high-variability content. In some cases, this adaptivity can take place within a single video file. As described, measurement of deviation of video complexity can be used to determine whether an average bitrate of a video file should be used for encoding, or a deviation-adjusted bitrate should be used. That is, for example, the technique can be selectively enabled when it may provide improved benefits, such as by comparing a level of deviation to a threshold set to determine when the technique should be used.

In at least some implementations, information used in disclosed techniques can be obtained from a source video file to be processed. For example, at least some containers, such as MP4, include information about a video file, bitrates for sample sizes for individual samples of the video, which can correspond to frames of the video (where a frame can be correlated to a frame rate, such as 30 frames per second). The information can be used to calculate the deviation-adjusted bitrate, which is a lightweight calculation since the needed data is readily available and does not require decompression of the source video. This lightweight process is beneficial as it further reduces computing resource use, and minimizes a delay in starting video streaming That is, users typically expect videos to begin playback very quickly after a video is selected, and so techniques that require significant time (which can be on the order of seconds) may be unsuitable for many streaming applications.

Disclosed technologies can be used with other common video streaming technologies, including adaptive bitrate streaming. As described above, streaming video is often made available in multiple different qualities. The quality used for playback can vary at a client device to try and maximize video quality while minimizing playback latency. If playing back video at an initial quality level causes pauses in playback, a client may choose to request video segments at a lower quality level. If conditions improve, the client may resume requesting video segments at a higher quality level.

In some scenarios, the present disclosure calculates a deviation-adjusted bitrate for a particular quality, such as a highest quality level that will be made available. That bit rate can be adjusted for lower quality levels, such as by multiplying the calculated bitrate by a factor (such as a percentage) that reduces the bitrate by an appropriate amount.

Example 2—Example Video Streaming Environment

FIG. 1 illustrates generally how a source video file 108 can be provided in a variety of quality levels to different consuming device, such as a desktop computer 112, a laptop 114, a tablet computing device 116, and a smartphone 118. The consuming devices 112, 114, 116, 118 can differ in a number of ways, including screen size, which can also be reflected in resolutions that are most useable on the consuming devices. The consuming devices 112, 114, 116, 118 can also differ in available computing resources, such as storage, memory, processor specifications, and expected network communication speeds.

As explained in Example 1, traditionally video streaming services are available to a variety of consuming devices, and provide different versions of the source video file 108 for streaming Typically, higher resolutions and bitrates are used for more powerful consuming devices. However, as explained, for any device, it can be beneficial to allow consuming devices to switch streams (bitrates) as conditions change.

As shown, four versions of the source video file 108 are available, either having already been encoded or being made available (such as by transcoding) using just in time encoding techniques. For this example, assume that video streams of resolutions 1080p, 720p, 480p, and 240p are to be made available, which correspond respectively to streams 120, 122, 124, 126. Each stream 120, 122, 124, 126 is associated with a particulate bitrate, which can be a standard bitrate or a bitrate that is otherwise selected for a particular stream quality. As shown, the streams 120, 122, 124, 126 are associated respectively with bitrates of 6 Mb/s, 2.7 Mb/s, 1.2 Mb/s, and 360 Kb/s. Each of the streams 120, 122, 124, 126 is associated with a respective plurality of segments 140, which are encoded using the bitrate associated with the respective stream. In some cases, the segments 140 actually have the bitrate of the respective stream 120, 122, 124, 126, while in other cases the bitrate can vary, such as if the stream bitrate is expressed as a target bitrate for a video encoder. That is, the video encoder may use the provided bitrate as a target, but may produce segments having a bitrate that differs from the target based on other considerations used by the video encoder.

The segments 140 correspond to segments of the source video file 108. The segments 140 include a plurality of frames 148. The frames 148 can correspond to frames used in video playback. For instance, if playback is specified at 30 frames/second, and each segment 140 is five seconds in duration, then each segment includes 150 frames.

Example 3—Example Source of Video File Bitrate Information

At least some video formats, such as the MP4 container, include metadata describing the video included in the container. Metadata can include an average bitrate for the file, or information from which the average bitrate and other information can be calculated.

Figure 2:
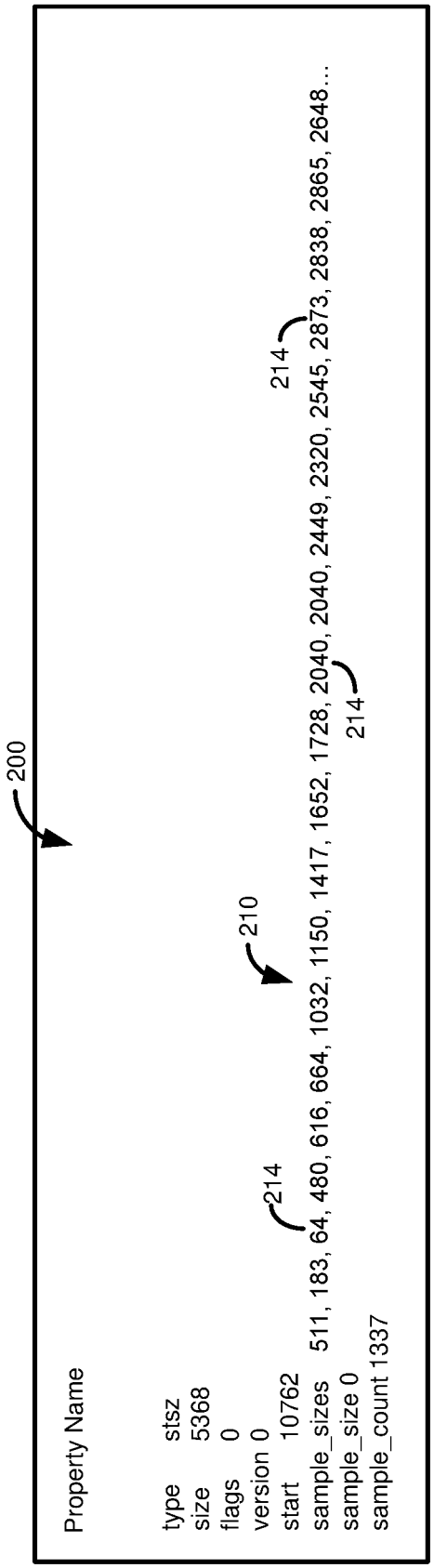
FIG. 2 is a diagram illustrating header information for an MP4 container than includes sample information useable in calculating deviation-adjusted bitrates.

FIG. 2 illustrates example information 200 that can be included in a video header file. The information 200 represents information maintained in a MP4 container. In some cases, if all samples (frames) in a video file are the same size, a single size will be provided as part of the information 200. As shown, the information 200 is for a video file that has frames of differing sizes. The information 200 provides a list 210 (or in some cases a table) of sample sizes 214 for individual samples. The samples can be listed in a sequential/chronological order.

The list 210 can be used to calculate various values useable in determining a deviation-adjusted bit rate for the video file, including an average frame size, a median frame size, an average bitrate, a median bitrate, or a standard deviation (or other measure of sample spread from a measure of a "center" of a dataset). As has been described, analogous calculations can be performed for subsets of samples in a video file, including subsets that correspond to particular transmission or encoding units for a streaming application. If the subsets correspond to units of time (such as one second of video, five seconds of video, etc.), the samples in the list 210 can be organized using the framerate for the video file. That is, if the video is specified as having thirty frames per second, the samples in the list can be grouped sequentially in units of thirty frames to provide video segments that are one second in duration, in groups of sixty samples, and so on. Statistics characterizing a center and a spread within a group of samples, such as average and standard deviation, can be used to calculate a deviation-adjusted bitrate for each transmission or encoding unit.

Calculating deviation-adjusted bitrates for individual video segments can be beneficial, as it can help reduce the size of streamed segments by avoiding unnecessary data—data that does not improve video quality as compared with that which might be achieved using a lower bitrate, and can provide improved quality for other segments. That is, using a deviation-adjusted bitrate instead of an average bitrate (or some other static bitrate) for an entire file can help provide a higher-bitrate when there are significant portions of a video with a higher-than-average bitrate (or, more generally, video segments of comparatively higher complexity). Or, if there are signification portions of lower bitrate/lower complexity segments, using a deviation-adjusted bitrate for an entire file can help reduce the amount of transmitted data, although quality may be reduced for video segments of higher complexity.

When deviation-adjusted bitrates are calculated on the level of particular segments, deviation from a center may be smaller within segments than within an entire video file, and segments are of shorter duration than the entire video file. So, for portions of a segment that have a bitrate/complexity less than the deviation-adjusted bitrate, any "wasted" bits will be reduced compared with using a single deviation-adjusted bitrate calculated for an entire file. In addition, some segments may have a bitrate/complexity that is higher than a deviation-adjusted bitrate for an entire file, and so those segments may have degraded image quality. Using a per-segment deviation-adjusted bit rate can provide improved quality for segments that would benefit from the use of higher bitrates.

It should be noted that in at least some cases a video encoder for use a target bitrate as a target, or perhaps as a maximum bitrate. While better encoding may be produced by providing a target bitrate that better reflects the video content, the video encoder may not produce output that has close to the target bitrate if that greatly exceeds the bitrate generated by video encoder based on other parameters/encoding operations.

Example 4—Example Derivation of Deviation-Adjusted Bitrate for Different Video Quality Levels The present disclosure can be used in situations where a single bitrate/quality level is advertised as available or where multiple bitrates/quality levels are available, such in adaptive streaming. In some cases, a deviation-adjusted bitrate is calculated for a highest-quality video that will be made available (or using a particular video quality, even if that video quality will not be made available). Lower-quality video streams can be made available by reducing the deviation-adjusted bitrate of the higher quality stream, such using progressively smaller percentages of such deviation-adjusted bitrate as stream quality decreases.

As a particular example, a framesize can be calculated for a highest quality. In the case of 1080p, the framesize is 1080×1920, or 2,073,600. Deviation-adjusted bitrates for lower-qualities can be calculated as the framesize of the lower quality multiplied by the deviation-adjusted bitrate for the highest quality, where that product is then divided by the framesize of the highest-quality.

Example 5—Example Benefits of Deviation-Adjusted Bitrate

As has been discussed, the deviation-adjusted bitrate can be calculated using data representing the center and spread of a dataset, such as the average bitrate and the standard deviation. The average bitrate can be calculated as the sum of the bits for individual samples in a video file divided by a length of time for the video (typically in seconds—providing a bits/second bitrate). The standard deviation for the sample set can calculated based on a particular unit of time, since the samples are particular frames of a video file, and have a size, but do not by themselves have a bit rate. In some cases, the standard deviation can be calculated on a sample-by-sample basis using the framerate—if the video is 30 fps, the bitrate for any given sample is the sample size divided by one-thirtieth. In other cases, bitrates can be calculated for particular groupings of samples, such as in one second intervals. So, for example, the average bitrate for a one-second sample of the video (such as for 30 frames) can be calculated, and the deviation from the average bitrate calculated, where the deviations for the individual video segments can be used to calculate the standard deviation for the overall video (which in turn can be used to calculate the deviation-adjusted bitrate).

In some cases, the deviation-adjusted bitrate is calculated by adding the bitrate deviation to the average bitrate. Depending on a desired result, the bitrate deviation can be multiplied by a factor (a constant, for example), and that value can be added to the average bitrate to provide the deviation-adjusted bitrate. Or, more complex formulas can be used to calculate the deviation-adjusted bitrate, including formulas that use the average bitrate and the deviation from the average bitrate.

As an example of how the disclosed techniques can be used, consider an example where a 720p source video is determined to have an average bitrate of 500 Kbps and a standard deviation of 280 Kbps. If the deviation-adjusted bitrate is calculated as the sum of the average bitrate and the standard deviation, the deviation-adjusted bitrate is 780 Kbps. Compare this bitrate to typical bitrates used for static bitrate encoding, where a bitrate of 2.7 Mbps is often used for 720p video.

In one example, a five-second video segment was encoded using the 2.7 Mbps bitrate, producing a segment size of 10 MB, and using the 780 Kbps deviation-adjusted bitrate, providing a segment size of 3.26 MB. The peak signal to noise ratio (PSNR) was measured for both output segments. A PSNR values of 41.42, at the low end of the "very good" range, was obtained using the static bitrate, while a PSNR value of 38.62, at the low end of the "good" range, was obtained using the deviation-adjusted bitrate. Thus, while the visual quality of the two segments is similar, the segment produced using the deviation-adjusted bitrate is about one-third of the size of the segment produced using a typical, static bitrate for 720p video. Even if the deviation-adjusted bitrate were increased, the segment size would still be less than using the typical, static value. For longer videos, it can be seen how the disclosed technique would result in the use of substantially fewer computing resources to encode, store, and transmit video.

Example 6—Example Comparison of Benefits of Deviation-Adjusted Bitrates for Different Video Types The nature of a particular video can affect the usefulness of the disclosed techniques. However, for the reasons already discussed, the disclosed technique will typically produce results that are at least comparable to using the average bitrate for a video as a target bitrate when the deviation for a video is low. Otherwise, using a deviation-adjusted bitrate for an entire file will typically be advantageous in producing video segments of higher quality than might be achieved using an average bitrate or a static bitrate (not specific to a particular video file) or in reducing segment sizes while maintaining acceptable video quality. Using deviation-adjusted bitrates for individual video segments can help improve both of these results, including achieving both advantages for a single video file.

Figure 3A:
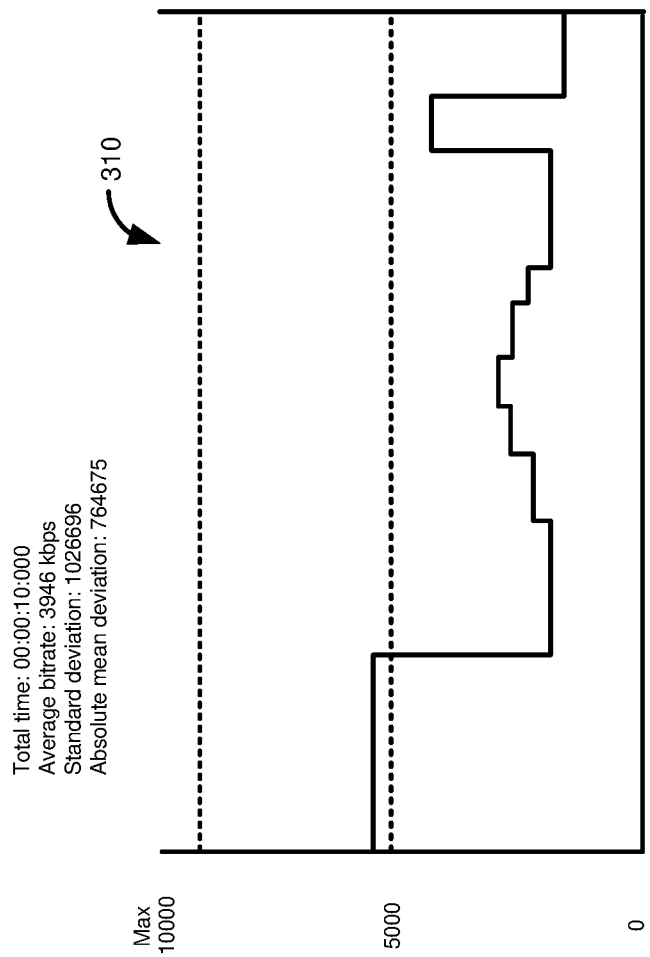
FIGS. 3A-3C are graphs of bitrate versus time for three videos having different variability types.
Figure 3B:
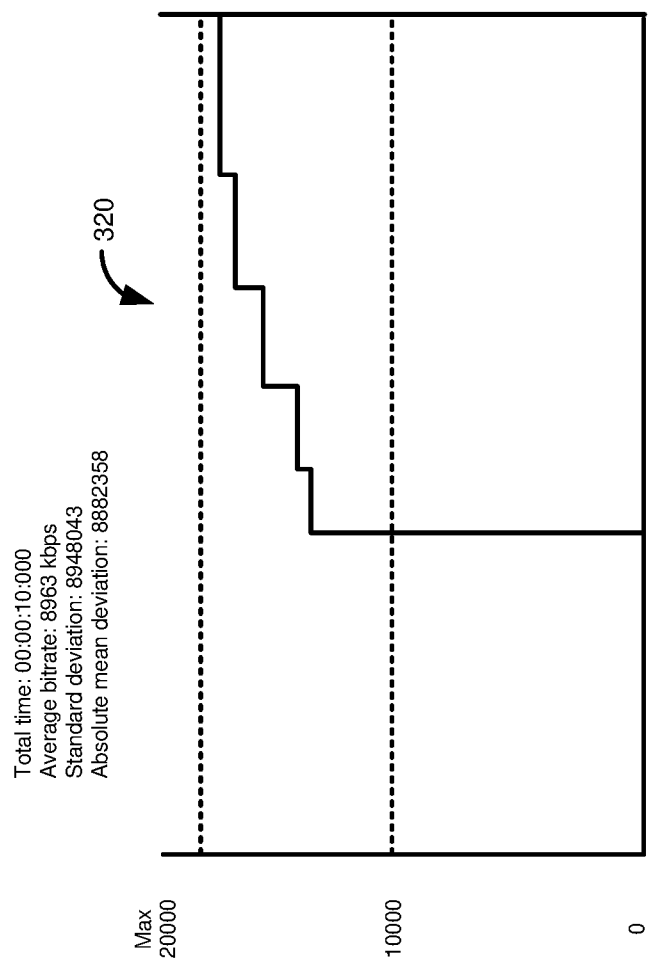
Figure 3C:
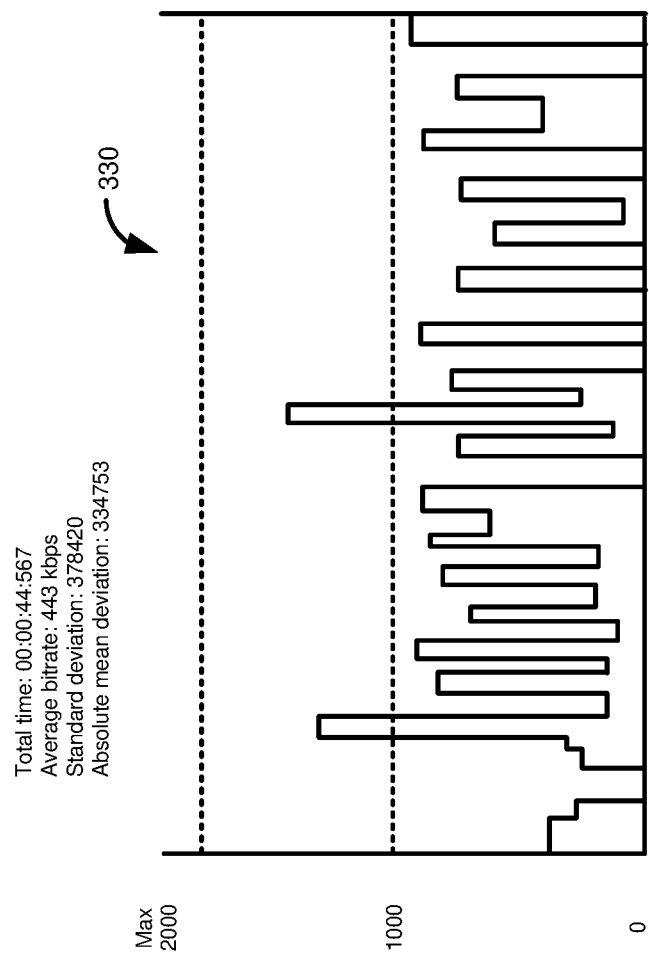

FIGS. 3A-3C illustrate example video files that illustrate how video complexity/sample size can vary over the duration of the video file. In FIG. 3A, a graph 310 illustrates bitrate versus time for a first video having an average bitrate of 3946 Kbps, a standard deviation of 1026696 bits (or 1026 Kb), and an absolute mean deviation of 764675 bits (or 764 kB). The earlier portion of the first video has a bitrate that is higher than the average, while the later portions of the video have bitrates that are slightly lower than the average. The first video can be considered to have a relatively constant bitrate, but it can be seen that using a deviation-adjusted bitrate based on the standard deviation (4.96 Mbps) or based on the absolute mean deviation (4.7 Mbps) can provide better video quality for portions of the first video where the bitrate/frame size exceeds the average than simply using the average bitrate for the first video. The selection of using the standard deviation or the absolute mean deviation in calculating the deviation-adjusted bitrate can be based on a preference to reduce segment size or provide improved video quality. Note that using deviation-adjusted bitrates for individual segments can improve overall video quality while maintaining or reducing the size of the overall video by using bitrates that are higher than average for complex video segments and bitrates that are less than the average for less complex video segments.

In FIG. 3B, a graph 320 illustrates bitrate versus time for a second video file. In the second video file, there is no video data, or a very minor amount of video data, for roughly the first half of the video, while the later half of the video has fairly complex content. In this case, the average bitrate is 8963 Kbps, the deviation-adjusted bitrate using the standard deviation is 17.9 Mbps, and the deviation-adjusted bitrate using the absolute mean deviation is 17.84 Mbps.

In the second video then, using the average bitrate produces a smaller overall file size than using either deviation-adjusted bitrate, but the average bitrate is roughly half of the bits present in the later portion of the video, which can reduce video quality. In at least some cases, it can be preferable to improve video quality even if file size (or individual segment sizes) increases. Again, using deviation-adjusted bitrates for individual segments can greatly reduce segment sizes for the first portion of the video, while providing sufficient bits to encode the second, later, portion of the video at high quality.

In FIG. 3C, a graph 330 illustrates bitrate versus time for a third video file, which exhibits fairly substantial variability in complexity/frame size over time. The third video has an average bitrate of 443 Kbps, a deviation-adjusted bitrate of 821 Kbps using the standard deviation, and a deviation-adjusted bitrate of 778 using the absolute mean deviation. In this case, there are a number of peaks in the video that are around 800 Kbps, as well as two peaks that are significantly higher. It can be seen that the average bitrate may produce degraded video quality for all of the peaks. The use of either of the deviation-adjusted bitrates matches the peaks at around 800 Kbps, while being below the bitrate for the higher peaks, including the max peak at 1465 Kbps. FIG. 3C, then, provides a particularly good example of how using deviation-adjusted bitrates for particular video segments can provide higher video quality for segments where higher bitrates are beneficial while providing lower sizes for segments of less complex video.

Example 7—Example Calculation of Deviation-Adjusted Bitrates Using an MP4 Container Disclosed techniques have been described as using framerate information to determine deviation-adjusted bitrates. In the case where the deviation-adjusted bitrate is determined for an entire video file, the average bitrate for the file can be simply determined based on the size of the file in bits and the duration of the video. However, the standard deviation is, at least in some cases, determined for discrete time intervals, where the samples for a particular segment/time interval can be selected using the framerate of the video. Similarly, calculating per-segment deviation-adjusted bitrates is typically carried out in standardized time units that are streamed (video is provided in one second segments, five second segments, etc.). Adjustments can be made to disclosed techniques to accommodate situations where the framerate of a video file is not constant.

In particular, at least some video files, specifically header files for a video container, include information that provides duration information for particular samples, which can be used to divide samples into segments of known durations for center or spread calculations. For instance, the MP4 container includes a component (known as an "atom") that stores sample sizes and other information (specifically the "stsz atom"). Another component, the "stts atom" (which in turn is within the "stbl atom"), includes a time-to-sample table that stores duration information for individual samples.

Example 8—Example Code for Calculating Deviation-Adjusted Bitrate, Parameters for Configuring Deviation-Adjusted Bitrate, and Inclusion of Deviation-Adjusted Bitrate Information In Video File Manifests FIG. 4 provides example code 400 illustrating how deviation-adjusted bitrates can be used in video encoding (including transcoding). An encoder, such as FFMPEG, can include methods to set encoding parameters, such as method 404 to set frame height, a method 406 to set frame width, a method 408 to set framerate, and a method 410 to set a target bitrate. The deviation-adjusted bitrate can be provided as the value for the method 410.

FIG. 5A provides example code 500 for calculating a deviation-adjusted bitrate for a video file. The code 500 is targeted for use with video in the MP4 container. At line 504, the "moovBox" element is parsed to extract various data, including from components (atoms) of the MP4 header that contain information such as sample sizes. The video duration is obtained at line 508. A loop 512 calculates a number of bits used in one-second segments of the video, where the values for individual segments are stored in array. Also note that the obtained sample sizes are in bytes, which are converted to bits as part of the loop 512. A loop 516 is used to calculate deviation information for individual segments ("buckets"), including using an overall bitrate for the video file. Lines 520, 524 calculate, respectively, the standard and absolute deviation for the video file using the deviation information from the loop 516. Although not shown in the code 500, the standard or absolute deviation can be added to the bitrate to provide the deviation-adjusted bitrate for the video file. FIGS. 5B-5E provide code for another example implementation for calculating deviation-adjusted bitrates.

FIG. 6 illustrates a set 600 of example parameters that can be used to enable/disable or configure the use of deviation-adjusted bitrates. Line 604 allows the deviation-adjusted bitrate feature to be selectively enabled or disabled. Lines 608 and 612 allow configuration of whether a deviation-adjusted bitrate is to be calculated during an initial analysis of a video file (such as when a file is uploaded or otherwise taken up for processing) or during video playback (such as in response to a request to stream the video). As discussed earlier, optionally a ratio or multiplier can be used to adjust the deviation-adjusted bitrate up or down. This parameter can be set as shown at line 616.

FIG. 6 also illustrates a set 650 of example parameters, including parameters 654, 658 that allow for configuring, respectively, the use of per-segment deviation-adjusted bitrates that are calculated during either analysis of the video or during playback.

A manifest for a streaming video can be annotated to indicate an overall bitrate or bitrates for individual video segments calculated using disclosed techniques. That is, the MP4 header or manifest information can store information that is used to provide a parameter to an encoder to affect video encoding. However, bitrate output from the encoder typically varies from this target bitrate. Providing actual or final deviation-adjusted bitrates in a manifest file can help a client program appropriate decode and display video segments. FIG. 7 illustrates an example manifest 710 in the HLS format and an example manifest 720 in the DASH format the include final bitrates 730 produced by a video encoder using the deviation-adjusted bitrate as an input parameter.

Example 9—Example Operations Implementing Disclosed Technologies

Figures 8, 9:
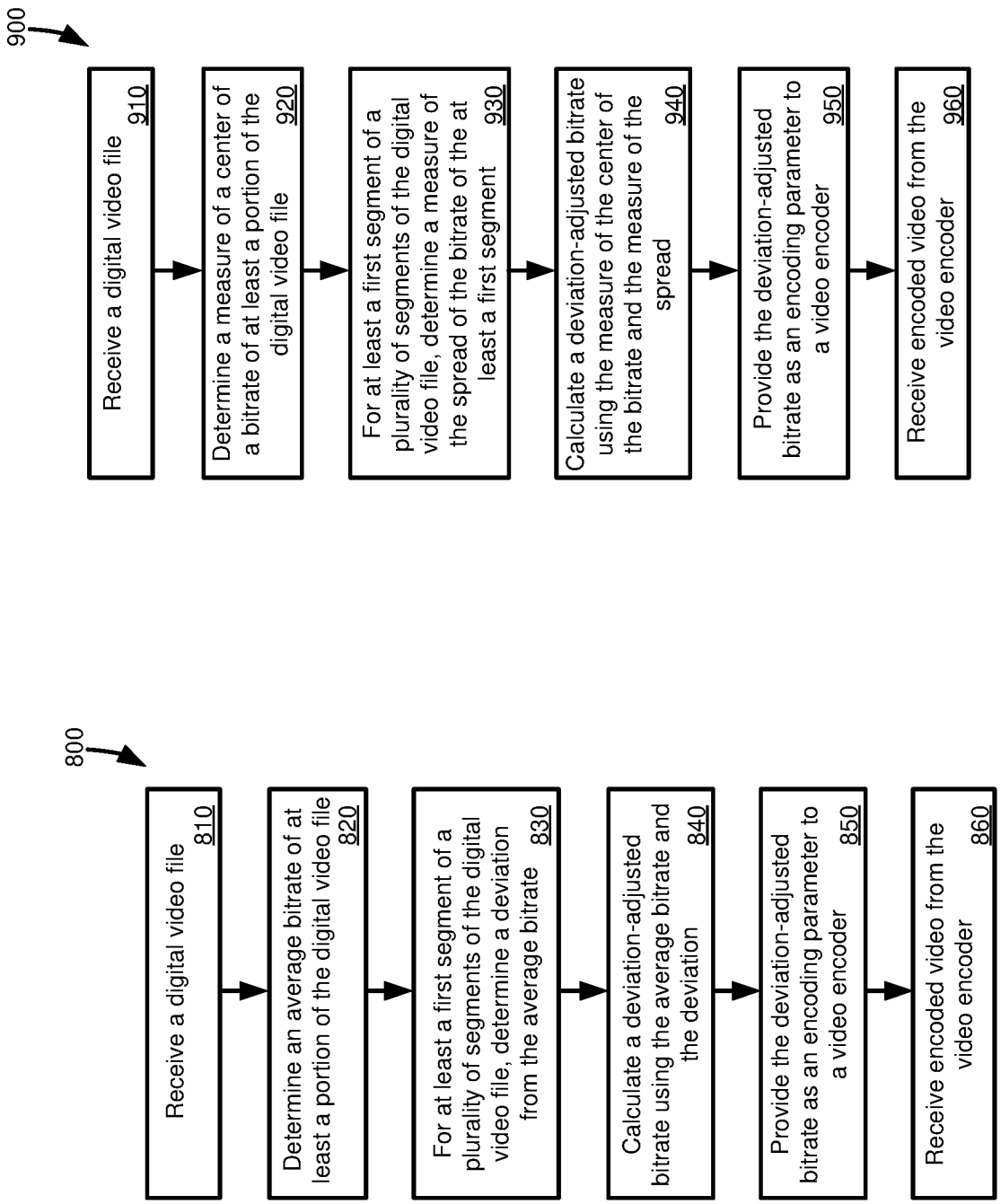
FIGS. 8 and 9 are flowcharts of example techniques for calculating and using deviation-adjusted bitrates.

FIG. 8 illustrates a flowchart 800 for a method of encoding video, such as for use in video streaming applications. A digital video file is received at 810. At 820, an average bitrate of at least a portion of the digital video file is determined. A deviation from the average bitrate is determined, at 830, for at least a first segment of a plurality of segments of the digital video file. At 840, a deviation-adjusted bitrate is calculated using the average bitrate and the deviation. The deviation-adjusted bitrate is provided as an encoding parameter to a video encoder at 850. Encoded video is received, at 860, from the video encoder and can be sent to a client device to be rendered for display.

FIG. 9 illustrates a flowchart 900 of a method of encoding video using a deviation-adjusted bitrate that is determined using measures of a center and a spread for a bitrate associated with a digital video file. A digital video file is received at 910. At 920, a measure of a center of a bitrate for a plurality of portions of the digital video file is calculated. A measure of a spread for the plurality of portion of the digital video file is determined at 930. A deviation adjusted bitrate is calculated at 940 using the measure of the center and the measure of the spread. At 950, the deviation-adjusted bitrate is provided as an encoding parameter to a video encoder. Encoded video is received from the video encoder at 960.

Example 10—Additional Examples

Example 1 is a computing system that includes at least one memory and at least one hardware processor coupled to the at least one memory. The computing system further includes one or more computer-readable storage media storing computer executable instructions that, when executed, cause the computing system to perform various operations. The operations include receiving a digital video file. An average bitrate of a least a portion of the digital video file is determined. A deviation from the average bitrate is determined for at least a first segment of a plurality of segments of the digital video file. A deviation-adjusted bitrate is calculated using the average bitrate and the deviation. The deviation-adjusted bitrate is provided as an encoding parameter to a video encoder. Encoded video is received from the video encoder.

Example 2 includes the subject matter of Example 1, and further specifies that the at least a portion of the digital video file is the entire digital video file.

Examples 3 includes the subject matter of Example 1 or Example 2, and further specifies that the determining a deviation from the average bitrate includes determining a deviation from the average bitrate for each of the plurality of segments of the digital video file.

Example 4 includes the subject matter of any of Examples 1-3, and further specifies that the operations include determining an overall deviation for the plurality of segments based at least in part on the average bitrate and the deviation from the average bitrate for the plurality of segments of the digital video file.

Example 5 includes the subject matter of Example 1, and further specifies that determining the average bitrate of at least a portion of the digital video file includes determining an average bitrate for the at least a first segment and the deviation-adjusted bitrate is a deviation-adjusted bitrate for the first segment.

Example 6 includes the subject matter of Example 1 or Example 5, and further specifies that the operations include calculating an average bitrate for each of the plurality of segments, calculating a deviation from the average bitrate for each of the plurality of segments, and calculating a deviation-adjusted bitrate for each of the plurality of segments using the average bitrate and the deviation for a respective segment of the plurality of segments.

Example 7 includes the subject matter of any of Examples 1-6, and further specifies that determining a deviation from the average bitrate includes determining an average bitrate for each of the plurality of segments.

Example 8 includes the subject matter of any of Examples 1-7, and further specifies that the deviation is determining as the standard deviation or the absolute mean deviation.

Example 9 includes the subject matter of any of Example 1-8, and further specifies that an average bitrate for respective samples of the plurality of examples is calculated using samples sizes of samples in a respective segment of the plurality of segments.

Example 10 includes the subject matter of Example 9, and further specifies that the samples correspond to frames of the digital video file.

Example 11 includes the subject matter of Example 9 or Example 10, and further species that the sample sizes are obtained from a header of the digital video file.

Example 12 includes the subject matter of any of Examples 1-11, and further specifies that the digital video file is comprised within an MP4 container.

Example 13 includes the subject matter of any of Examples 1-12, and further specifies that the deviation-adjusted bitrate is a first deviation-adjusted bitrate calculated for a first quality level and that the operations further include calculating a second deviation-adjusted bitrate for a second quality level at least in part by multiplying the first deviation-adjusted bitrate by a percentage. The second quality level is lower than the first quality level.

Example 14 includes the subject matter of any of Examples 1-13, and further specifies that calculating the deviation-adjusted bitrate includes adding the deviation to the average bitrate.

Examples 15 includes the subject matter of any of Examples 1-14, and further specifies that calculating the deviation-adjusted bitrate includes multiplying the deviation or deviation-adjusted bitrate by a correction factor.

Example 16 includes the subject matter of any of Examples 1-15, and further specifies that the calculating is carried out in response to a request from a client device to stream the digital video file.

Example 17 includes the subject matter of any of Examples 1-16, and further specifies sending the encoded video to a client device.

Example 18 includes the subject matter of any of Examples 1-17, and further specifies that segments of the plurality of segments correspond to segments of a defined time interval.

Example 19 is one or more computer-readable media storing computer-executable instructions that, when executed, cause the computing system to perform various operations. The operations include receiving a digital video file. A measure of a center of a bitrate for a plurality of portions of the digital video file are calculated. For at least a first segment of the plurality of segments, a measure of a spread for the at least a first segment. A deviation-adjusted bitrate is calculated using the measure of the center and the measure of the spread. The deviation-adjusted bitrate is provided as an encoding parameter to a video encoder. Encoded video is received from the video encoder. Further Examples incorporate the subject matter of any of Examples 2-18, 21, and 22 into the subject matter of Example 19.

Example 20 is a method that can be implemented in hardware, software, or a combination thereof. A digital video file is received. A measure of a center of a bitrate of at least a portion of the digital video file is calculated. For at least a first video segment of a plurality of video segments of the digital video file, a measure of the spread for at least a first video segment is determined. A deviation-adjusted bitrate is calculated using the measure of the center of the bitrate and the measure of the spread. The deviation-adjusted bitrate is provided as an encoding parameter to a video encoder. Encoded video is received from the video encoder. Further Examples incorporate the subject matter of any of Examples 2-18, 21, and 22 into the subject matter of Example 20.

Example 21 includes the subject matter of any of Examples 1-18, where the calculating the deviation-adjusted bitrate adaptively produces higher deviation-adjusted bitrates as the deviation of the at least a portion of the digital video file increases.

Example 22 includes the subject matter of Example 2, and further includes comparing the deviation from the average bitrate to a threshold and determining that the deviation from the average bitrate satisfies the threshold, where the calculating and the providing are carried out in response to the determining that the deviation from the average bitrate satisfies the threshold.

Example 11—Computing Systems

Figure 10:
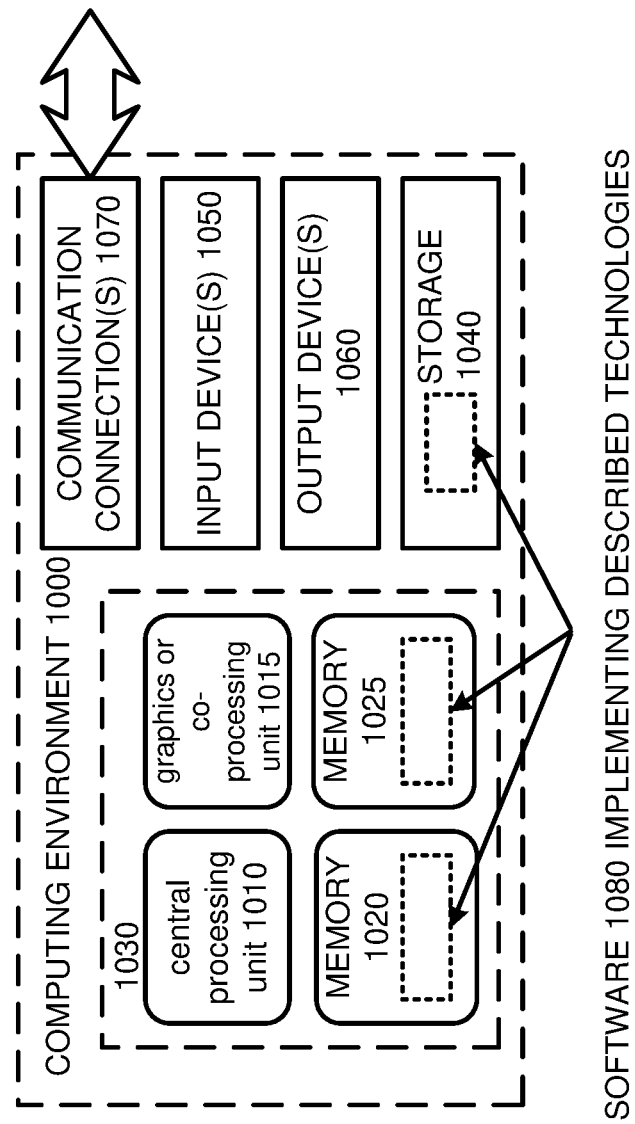
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing the features described in Examples 1-10. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 may have additional features. For example, the computing system 1000 includes storage 1040, one or more input devices 1050, one or more output devices 1060, and one or more communication connections 1070, including input devices, output devices, and communication connections for interacting with a user. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way, and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 12—Cloud Computing Environment

Figure 11:
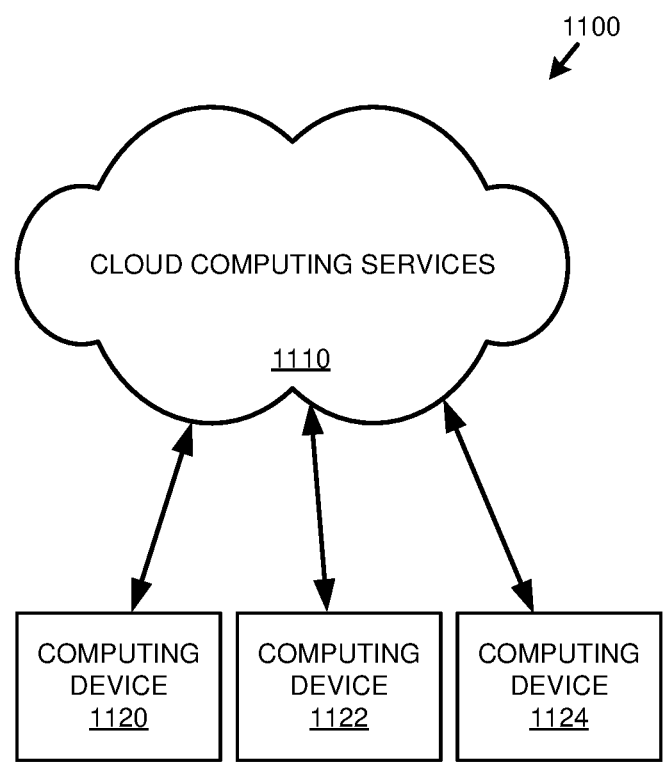
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operations (e.g., data processing, data storage, and the like).

Example 13—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one memory;
   at least one hardware processor coupled to the at least one memory; and
   one or more computer readable storage media storing computer-executable instructions, that when executed, cause the computing system to perform operations comprising:
     receiving a digital video file;
     determining an average bitrate of at least a portion of the digital video file;
     for at least a first segment of a plurality of segments of the digital video file, determining a deviation from the average bitrate;
     calculating a deviation-adjusted bitrate using the average bitrate and the deviation;
     providing the deviation-adjusted bitrate as an encoding parameter to a video encoder to optimize encoding of the at least a first segment of the digital video file for an aggregate level of video complexity represented in the at least a first segment of the digital video file, such that lower bitrate segments use less computing resources during encoding to account for lower complexity and higher bitrate segments use more computing resources during encoding to account for higher complexity; and
     receiving encoded video produced by the video encoder from the at least a first segment and using the deviation-adjusted bitrate encoding parameter.

2. The computing system of claim 1, wherein the at least a portion of the digital video file is the entire digital video file.

3. The computing system of claim 2, the operations further comprising:
   comparing the deviation from the average bitrate to a threshold; and
   determining that the deviation from the average bitrate satisfies the threshold;
   wherein the calculating and the providing are carried out in response to the determining that the deviation from the average bitrate satisfies the threshold.

4. The computing system of claim 2, wherein the determining a deviation from the average bitrate comprises determining a deviation from the average bitrate for each of the plurality of segments of the digital video file.

5. The computing system of claim 4, the operations further comprising:
   determining an overall deviation for the plurality of segments based at least in part on the average bitrate and the deviations from the average bitrate for the plurality of segments of the digital video file.

6. The computing system of claim 1, wherein the determining an average bitrate of at least a portion of the digital video file comprises determining an average bitrate for the at least a first segment and the deviation-adjusted bitrate is a deviation-adjusted bitrate for the at least a first segment.

7. The computing system of claim 1, wherein the determining a deviation from the average bitrate comprises determining an average bitrate for each of the plurality of segments.

8. The computing system of claim 1, wherein the deviation is determined as the standard deviation or the absolute mean deviation.

9. The computing system of claim 1, the operations further comprising:
   calculating an average bitrate for each of the plurality of segments;
   calculating a deviation from the average bitrate for each of the plurality of segments; and
   calculating a deviation-adjusted bitrate for each of the plurality of segments using the average bitrate and the deviation for a respective segment of the plurality of segments.

10. The computing system of claim 9, wherein the average bitrate for respective segments of the plurality of segments is calculated using sample sizes of samples in a respective segment of the plurality of segments.

11. The computing system of claim 10, wherein the samples correspond to frames of the digital video file.

12. The computing system of claim 10, wherein the sample sizes are obtained from a header of the digital video file.

13. The computing system of claim 12, wherein the digital video file is comprised within an MP4 container.

14. The computing system of claim 1, wherein the deviation-adjusted bitrate is a first deviation-adjusted bitrate calculated for a first quality level, the operations further comprising:
   calculating a second deviation-adjusted bitrate for a second quality level, the second quality level being lower than the first quality level, at least in part by multiplying the first deviation-adjusted bitrate by a percentage.

15. The computing system of claim 1, wherein the calculating the deviation-adjusted bitrate comprises adding the deviation to the average bitrate.

16. The computing system of claim 1, wherein the calculating the deviation adjusted bitrate comprises multiplying the deviation or deviation-adjusted bitrate by a correction factor.

17. The computing system of claim 1, wherein the calculating the deviation-adjusted bitrate adaptively produces higher deviation-adjusted bitrates as the deviation of the at least a portion of the digital video file increases.

18. The computing system of claim 1, wherein segments of the plurality of segments correspond to segments having a defined time interval.

19. One or more computer readable storage media comprising:
- computer-executable instructions that, when executed by a computing system comprising at least one hardware processor and at least one memory coupled to the at least one hardware processor, cause the computing system to receive a digital video file;
- computer-executable instructions that, when executed by the computing system, cause the computing system to calculate a measure of a center of a bitrate for a plurality of portions of the digital video file;
- computer-executable instructions that, when executed by the computing system, cause the computing system to, for at least a first segment of a plurality of segments of the digital video file, calculate a measure of a spread for the at least a first segment of the digital video file;
- computer-executable instructions that, when executed, cause the computing system to calculate a deviation-adjusted bitrate using the measure of the center and the measure of the spread;
- computer-executable instructions that, when executed, cause the computing system to provide the deviation-adjusted bitrate as an encoding parameter to a video encoder to optimize encoding of the at least a first segment of the digital video file for an aggregate level of video complexity represented in the at least a first segment of the digital video file, such that lower bitrate segments use less computing resources during encoding to account for lower complexity and higher bitrate segments use more computing resources during encoding to account for higher complexity; and
- computer-executable instructions that, when executed, cause the computing system to receive encoded video produced by the video encoder from the at least a first segment and using the deviation-adjusted bitrate encoding parameter.

20. A method, implementing in a computing system comprising (1) hardware-implemented processing logic, or (2) at least one hardware processor and at least one memory coupled to the one hardware processor and computer-readable storage media comprising suitable computer-executable instructions for performing the method, the method comprising:
- receiving a digital video file;
- determining a measure of a center of a bitrate of at least a portion of the digital video file;
- for at least a first segment of a plurality of segments of the digital video file, determining a measure of the spread of the bitrate of the at least a first segment is determined;
- calculating a deviation-adjusted bitrate using the measure of the center of the bitrate and the measure of the spread;
- providing the deviation-adjusted bitrate as an encoding parameter to a video encoder to optimize encoding of the at least a first segment of the digital video file for an aggregate level of video complexity represented in the at least a first segment of the digital video file, such that lower bitrate segments use less computing resources during encoding to account for lower complexity and higher bitrate segments use more computing resources during encoding to account for higher complexity; and
- receiving encoded video produced by the video encoder from the at least a first segment and using the deviation-adjusted bitrate encoding parameter.

* * * * *